(12) United States Patent
Hinderling et al.

(10) Patent No.: US 9,618,328 B2
(45) Date of Patent: Apr. 11, 2017

(54) OPTICAL MEASURING SYSTEM WITH FILTER UNIT FOR EXTRACTING ELECTROMAGNETIC RADIATION

(75) Inventors: Jürg Hinderling, Marbach (CH); Knut Siercks, Mörschwil (CH)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 0 days.

(21) Appl. No.: 14/128,454

(22) PCT Filed: Jul. 25, 2012

(86) PCT No.: PCT/EP2012/064606
§ 371 (c)(1),
(2), (4) Date: Dec. 20, 2013

(87) PCT Pub. No.: WO2013/014190
PCT Pub. Date: Jan. 31, 2013

(65) Prior Publication Data
US 2014/0125990 A1  May 8, 2014

(30) Foreign Application Priority Data

Jul. 26, 2011 (EP) .................................. 11175392

(51) Int. Cl.
*G01B 11/00* (2006.01)
*G02B 5/28* (2006.01)
*G01C 15/00* (2006.01)

(52) U.S. Cl.
CPC .......... *G01B 11/002* (2013.01); *G01C 15/002* (2013.01); *G02B 5/284* (2013.01)

(58) Field of Classification Search
CPC .. G01J 3/26; G02B 5/28; G02B 5/284; G01D 5/266; G01D 5/353; G01B 11/002; G01B 11/03

(Continued)

(56) References Cited

U.S. PATENT DOCUMENTS 6,734,410 B2  5/2004 Kaneko et al.
6,891,141 B2  5/2005 Kaneko et al.
(Continued)

FOREIGN PATENT DOCUMENTS

CN   101965498 A   2/2011
DE   197 107 22 A1   10/1997
(Continued)

OTHER PUBLICATIONS

European Search Report dated Feb. 28, 2012 as received in Application No. EP 11 17 5392.

*Primary Examiner* — Jonathan Hansen
(74) *Attorney, Agent, or Firm* — Maschoff Brennan (57) ABSTRACT

An optical measuring system determines coordinates of points for distance measurement. The measuring system includes a radiation source for emitting electromagnetic radiation and a receiving unit having a filter unit for extracting electromagnetic radiation in a defined wavelength range and having, a detector, such that the radiation extracted by the filter unit is detectable by the detector. The filter unit includes at least two mirror elements which are at least partly reflective and constructed in a multilayered fashion. The mirror elements are substantially parallel to one another. Two adjacent mirror elements in each case enclose a cavity and are arranged at a specific distance from one another. An optical thickness is defined by a refractive index of the cavity and by the distance between the mirror elements. Optical thickness varying means operate to varying the optical thickness, such that an extractable wavelength range of the filter unit is varied.

19 Claims, 7 Drawing Sheets

(58) Field of Classification Search
USPC .................................. 356/454, 496, 506, 519
See application file for complete search history.

(56) References Cited

U.S. PATENT DOCUMENTS

| | | | |
|---|---|---|---|
| 7,385,704 B2* | 6/2008 | Mestha et al. ................ | 356/454 |
| 8,581,978 B2 | 11/2013 | Kludas | |
| 2001/0024270 A1 | 9/2001 | Shirai et al. | |
| 2003/0173499 A1 | 9/2003 | Cole et al. | |
| 2004/0178322 A1 | 9/2004 | Kaneko et al. | |
| 2005/0018301 A1* | 1/2005 | Uehara ........................ | 359/586 |
| 2007/0153288 A1* | 7/2007 | Wang ........................ | G01J 3/02 |
| | | | 356/454 |
| 2010/0142067 A1 | 6/2010 | Hanamura et al. | |
| 2011/0176128 A1* | 7/2011 | Matsuno ........................ | 356/72 |

FOREIGN PATENT DOCUMENTS

| | | |
|---|---|---|
| DE | 199 267 06 A1 | 12/1999 |
| DE | 198 40 049 A1 | 4/2000 |
| DE | 199 495 80 A1 | 4/2000 |
| DE | 101 21 288 A1 | 12/2001 |
| EP | 0 498 375 A1 | 8/1992 |
| EP | 1 081 459 A1 | 3/2001 |
| EP | 1 662 278 A1 | 5/2006 |
| EP | 1 686 350 A1 | 8/2006 |
| EP | 2 120 082 A1 | 11/2009 |
| EP | 2 219 011 A1 | 8/2010 |
| JP | 2002-148041 A | 5/2002 |
| WO | 97/40420 A1 | 10/1997 |

* cited by examiner

OPTICAL MEASURING SYSTEM WITH FILTER UNIT FOR EXTRACTING ELECTROMAGNETIC RADIATION

FIELD OF THE INVENTION

The invention relates to an optical measuring system for determining coordinates of points comprising a radiation source and a receiving unit having a filter unit for extracting electromagnetic radiation in a defined wavelength range, a use of the filter unit for extracting electromagnetic radiation with an optical measuring system, and a corresponding method.

BACKGROUND

For measuring a target point, numerous geodetic surveying apparatuses have been known since ancient times. In this case, direction or angle and usually also distance from a measuring apparatus to the target point to be measured are recorded and, in particular, the absolute position of the measuring apparatus together with reference points possibly present are detected as spatial standard data.

Generally known examples of such geodetic surveying apparatuses include the theodolite, tachymeter, total station and also laser scanner, which are embodied in the terrestrial and airborne variants. One geodetic measuring device from the prior art is described in the publication document EP 1 686 350. for example. Such apparatuses have electrical-sensor-based angle and, if appropriate, distance measuring functions that permit direction and distance to be determined with respect to a selected target. In this case, the angle and distance variables are determined in the internal reference system of the apparatus and, if appropriate, also have to be combined with an external reference system for absolute position determination.

Modern total stations have microprocessors for digital further processing and storage of detected measurement data. The apparatuses generally have a compact and integrated design, wherein coaxial distance measuring elements and also computing, control and storage units are usually present in an apparatus. Depending on the application, total stations are additionally equipped with motorization of the targeting or sighting device and—in the case of the use of retroreflectors (for instance an all-round prism) as target objects—means for automatic target seeking and tracking. As a human-machine interface, the total station can have an electronic display control unit—generally a microprocessor computing unit with electronic data storage means—with display and input means, e.g. a keyboard. The measurement data detected in an electrical-sensor-based manner are fed to the display control unit, such that the position of the target point can be determined, optically displayed and stored by the display control unit.

For sighting or targeting the target point to be measured, geodetic surveying apparatuses of the generic type such as total stations comprise a telescopic sight, such as e.g. an optical telescope, as sighting device. The telescopic sight is generally rotatable about a vertical axis and about a horizontal tilting axis relative to a base of the measuring apparatus, such that the telescopic sight can be aligned with the point to be measured by pivoting and tilting. Modern apparatuses can have, in addition to the optical viewing channel, a camera for detecting an image, said camera being integrated into the telescopic sight and being aligned for example coaxially or in a parallel fashion, wherein the detected image can be represented, in particular, as live image on the display of the display control unit and/or on a display of the peripheral apparatus—such as e.g. the data logger—used for remote control. In this case, the optical system of the sighting device can have a manual focus—for example an adjusting screw for varying the position of a focusing optical system—or an autofocus, wherein the focus position is varied e.g. by servomotors. By way of example, such a sighting device of a geodetic surveying apparatus is described in EP 2 219 011. Automatic focusing devices for telescopic sights of geodetic apparatuses are known e.g. from DE 197 107 22, DE 199 267 06 or DE 199 495 80. Moreover, the construction of generic telescopic sights of geodetic apparatuses is disclosed by way of example in the publication documents EP 1 081 459 or EP 1 662 278.

On account of the beam path that is usually to be utilized jointly both as viewing channel and for measurements, such apparatuses require the technical design of said beam path in the manner of construction of a telescope with specialized, high-precision optical systems that are to be produced with a high outlay. Furthermore, an additional separate transmitting and receiving channel and also an additional image plane for the wavelength of the distance measuring device can be provided for the coaxial electronic distance measurement.

Since target objects (e.g. the plumb rods with target mark, such as an all-round prism, which are usually used for geodetic purposes) cannot be targeted sufficiently precisely with the naked eye on the basis of the sighting device despite the 30-fold optical magnification often provided, conventional surveying apparatuses in the meantime have as standard an automatic target tracking function for prisms serving as target reflector (ATR: "Automatic Target Recognition"). For this, a further separate ATR light source—e.g. a fiber-coupled laser diode, which emits electromagnetic radiation having a wavelength preferably in the infrared range of 850 nm, for example—and a specific ATR detector (e.g. CMOS area sensor) sensitive to said wavelength are conventionally additionally integrated in the telescope.

In the context of the ATR fine targeting function, in this case the ATR measurement beam is emitted in the direction of the optical targeting axis of the sighting device and is retroreflected at the target reflector and the reflected beam is detected by the ATR sensor. Depending on the deviation of the alignment of the optical targeting axis from the prism, in this case the impingement position of the reflected radiation on the ATR sensor also deviates from a central sensor area position (i.e. the reflection spot of the ATR measurement beam retroreflected at the prism on the ATR area sensor does not lie in the center of the ATR area sensor and therefore does not impinge on a desired position defined e.g. on the basis of calibration as that position which corresponds to the optical targeting axis).

If this is the case, then the alignment of the sighting device is slightly readjusted in a motorized manner in such a way that the ATR measurement beam retroreflected at the prism impinges highly precisely in the center of the sensor area on the ATR area sensor (i.e. the horizontal and vertical angles of the sighting device are thus iteratively changed and adapted until the center of the reflection spot coincides with the desired position on the ATR area sensor). Alternatively, a residual deviation between the impingement point of the retroreflected ATR measurement beam on the ATR area sensor and the center of the sensor area can also be taken into account computationally and converted into an angle, which is correspondingly added to the solid angle—detected with the aid of the angle sensors—at which the targeting axis points.

Besides the ATR fine targeting function, an automatic target tracking functionality can also be provided in a similar manner and using the same ATR components (such as ATR light source and ATR detector).

An impairment of the distance measurement or of the automatic target tracking can be caused here e.g. by stray radiation, wherein, besides the radiation having a defined characteristic that is emitted by the radiation source, further disturbing radiation components can impinge on the detector (for detecting the radiation that is emitted by the radiation source and reflected) and cause a deviation of a measured value.

Ambient or extraneous light can thus lead to undesired influences or impairments of measuring devices. Direction or position measurement by means of optical semiconductor sensors (e.g. PSD) or area sensors (e.g. CCD or CMOS) can be corrupted e.g. by parasitic background light impinging on the detector. This leads for example to centroid shifts, induced by a modified light distribution on the sensor or by a variation of the electronic operating point of the sensor.

Measuring devices comprising spectrally narrowband radiation sources such as laser diodes in some instances afford the possibility of suppressing the ambient light on the receiving channel for the most part by means of an appropriate cut-off filter or bandpass filter. Primarily lasers emit in a very narrowband manner in a spectral range of less than 1 nm. However, cost-effective lasers such as laser diodes have the disadvantage that the center wavelength thereof differs from specimen to specimen; moreover, the emission wavelength in most semiconductor laser diodes is dependent on the operating point (forward current) and the chip temperature.

This has the effect that the optical bandpass filters, generally configured as interference filters, upstream of the detector are of spectrally wide design. As a result, however, the ambient light cannot be optimally suppressed.

This disadvantage is analogously applicable to coordinate measuring machines comprising optical sensors for measuring coordinates of measurement points.

Coordinate measuring machines, for checking technical components with regard to their form and their dimensions, in this case have a movable measuring head that can be moved within a measurement space. For this purpose, as is known, coordinate measuring machines can be constructed as gantry constructions or articulated arms by means of which the measuring head is freely movable in three directions (X,Y,Z) and wherein the position of the measuring head and thus a position on a workpiece measured optically by the measuring head can be determined in the measurement space continuously and precisely.

Furthermore, the impairment mentioned above can occur in the case of contactlessly measuring optical scanners for generating e.g. a three-dimensional representation of a surface of an object. These scanning devices are usually designed as laser scanners, wherein laser radiation having a defined wavelength is emitted and reflected at the object. By means of a detector, which in the optimum case detects and measures exclusively light having the same wavelength, distance and direction measurements can thus be carried out in a point-resolved manner. In this case, the laser beam can be guided line by line over the surface.

Distance measuring modules comprising a plurality of light sources having different emission wavelengths are also known, as can be gathered from DE 198 40 049. for example. There, depending on the measurement application, either one or the other laser is directed at the same common detector; in that case, the interference filter upstream of the receiver is designed as a double interference filter having two transmission windows. This has the disadvantage that the ambient light is not optimally suppressed. In the case of multi-channel transmitting units which differ spectrally-optically and are directed at a common receiving unit, the problem of suppressing stray radiation and also of mutual channel crosstalk increases with the number of channels.

The prior art discloses at least two approaches for solving the stray radiation problem. Firstly, a filter is arranged into the beam path of the receiving optical system upstream of the detector in such a way that exclusively electromagnetic radiation in a defined wavelength range—as narrowband as possible—can pass through the filter and impinge on the detector. As is known, the filter used for this purpose has a predetermined transmission behavior. Moreover, the radiation source is electronically and thermally stabilized with regard to the emitted wavelength with a high outlay, i.e. is supplied with a constant voltage and current and operated at a defined temperature, in particular by the cooling or heating of the radiation source. This specified emitting-receiving device requires a high level of constructional outlay and energy expenditure.

The second approach proposes the use of two filters, one high-pass filter and one low-pass filter, wherein the filters are arranged one behind another in the beam path and thus achieve a relatively well-defined filter effect. The filters can additionally be tilted relative to the beam path thereby enabling a change in the filter behavior and thus an adaptation to the incoming radiation. Such an arrangement can be gathered from DE 101 21 288. for example. What is disadvantageous about this arrangement is the occurrence of polarization effects during the tilting of the filters.

The two solution approaches additionally exhibit the disadvantage of a highly complex and structural-space-intensive construction of the respective measuring apparatuses. Moreover, very complex control or regulation of the radiation source or of the tiltable filters is required in order that optimum detection in the suitable wavelength can be ensured continuously.

SUMMARY

Therefore, it is an object of the present invention to provide a system for point measurement which allows a more precise and more reliable measurement of measurement points and can be realized with a smaller constructional outlay.

The invention relates to an optical measuring system for determining coordinates of points, more particularly for distance measurement, more particularly a geodetic surveying apparatus, coordinate measuring machine or scanning device. The measuring system comprises a radiation source for emitting electromagnetic radiation having an emission wavelength, and a receiving unit having a filter unit for extracting electromagnetic radiation in a defined wavelength range according to the interference principle, and a detector arranged in such a way that the radiation that can be extracted by means of the filter unit is detectable by the detector. Moreover, the filter unit comprises at least two mirror elements which are at least partly reflective and which are constructed in a multilayered fashion, wherein the mirror elements are oriented substantially parallel to one another and two adjacent mirror elements in each case enclose a cavity and are arranged at a specific distance with respect to one another. In this case, an optical thickness is defined by a refractive index of the cavity and by the distance between the mirror elements. Moreover, the filter unit comprises optical thickness varying means for varying the optical thickness, such that an extractable wavelength range of the filter unit is varied, more particularly wherein the optical thickness varying means have actuating means for varying the position of the mirror elements and/or refractive index adjusting means for varying the refractive index of the cavity, more particularly wherein the optical thickness is variable continuously during operation. The filter unit can accordingly be designed as a tunable interference filter described above.

In this case, the optical thickness varying means constitute a component by means of which the optical thickness can be varied in a targeted manner. In this regard, actuating means, e.g. electrostatic actuators, can be provided here, which can bring about a change in the position of the mirror elements, and thus a change in the distance between the mirrors. For this purpose, the actuators can be deflected in a defined manner by means of control signals, for example. Furthermore, the refractive index adjusting means can have e.g. a medium whose refractive index can be varied by means of the application of a defined voltage to the medium. The medium can be embodied for example by a gas, a liquid or by a polymer. Moreover, the refractive index adjusting means can have a control subunit which regulates corresponding signals or a voltage with which the refractive index of the medium can be adjusted and varied.

Tunable interference filters are based on dielectrically coated mirrors, in which at least one of the layers can be tuned with regard to the optical thickness. Optical thickness is understood to mean the product of layer thickness and refractive index. Almost any conceivable spectral filter curve can be realized by means of the multilayer thin-film coatings of electromagnetically transparent materials. The simplest tunable interference or bandpass filters are based on a Fabry-Perot filter, which is likewise provided with a multilayer thin-film coating. The transmission or reflection curve is varied or shifted preferably according to an electromechanical adjusting mechanism such as, for example, piezoelectric, electrostatic or magnetic actuator system. Shifts with interferometric accuracy are achievable according to the electrostatic principle; in this case, e.g. the position of a spacer plate or the distance between two main reflectors of a Fabry-Perot structure can be varied. Moreover, the transmission or reflection curve can be varied by the refractive index being varied.

By means of a tunable filter it is possible to solve, as discussed above, the problems of deviating spectral windows, shiftable or variable emission wavelengths or receiver curves, but also multi-wavelength devices. Consequently, according to the invention, a tunable interference filter can be integrated into an optical measuring system, more particularly for distance and direction measurement. With the tunable interference filter, the ambient or extraneous light is intended to be kept away from the respective detection unit.

Particularly in the case of devices comprising a plurality of light sources, this has the advantage that the suppression of the ambient light, e.g. of the light from all light sources except for the desired light source, can be realized in a manner equivalent to a one-channel system.

In particular, this principle can be suitable for laser sensors such as EDM (distance measurement), ATR (automatic target point measurement) or power search (target seeking) e.g. for a tachymeter, total station, laser scanner, laser tracker or alternatively receivers for rotary lasers or for construction machine control. The sunlight, ambient light or extraneous light can thereby be filtered out upstream of the respective receiver by means of a currently (at the time of the use or function) optimally tuned interference filter. Since emission wavelengths of laser diodes can vary from specimen to specimen and, moreover, the wavelength thereof can shift owing to temperature and operating point (current that is present), a spectrally tunable bandpass filter can in this case be centered to the respective wavelength of the laser for optimizing the transmission of the filter. The extraneous light can thus largely be blocked by the narrow transmission curve of the tunable filter.

More particularly, according to the invention, the measuring system can comprise a regulating unit, wherein the regulating unit interacts with the optical thickness varying means in such a way that the optical thickness, more particularly the distance between the mirror elements or between dielectric multilayer elements to be understood as mirror elements, is variable, more particularly is varied automatically, such that the extractable wavelength range lies around the emission wavelength of the emitted radiation. Thus, in the measuring system, e.g. in a total station or a laser scanner, a useful wavelength of the filter can be adjusted such that the wavelength to be filtered corresponds to that which is actually emitted by the radiation source of the system.

More particularly, according to the invention, the regulating unit can interact with the optical thickness varying means and the detector in such a way that the optical thickness is adjustable depending on a detection of the detector. By means of such regulation, the wavelength range of the filter unit can be adapted continuously, for example, such that in each case a minimum of radiation can be detected at the detector. If, in this case, e.g. a fall in the radiation intensity is ascertained by means of the detector, then the distance between the dielectric multilayer elements and/or the refractive index of the cavity in the filter can be varied, more particularly wherein the distance is variable over a wide distance range, until a predefined minimum or threshold value is exceeded.

Moreover, according to the invention, the optical thickness can be adjustable by means of the optical thickness varying means in such a way that a measured value detected by means of the detector exceeds a defined threshold value, more particularly attains a maximum value. A corresponding adaptation of the mirror distance and/or of the optical property of the medium in the cavity can thus also be effected for the purpose of maintaining an optimum (maximum) extraction capability of the filter for a respective wavelength or during a drift of the wavelength.

Furthermore, according to the invention, the extractable wavelength range can be defined by a center wavelength representing an extraction maximum, and a tolerance range around the center wavelength defined depending on an extraction level-wavelength profile.

Depending on the design of the filter unit, specifically adapted extraction behaviors (transmission and/or reflection behaviors) of the filters can be defined, wherein a level of a proportion of radiation to be extracted can vary depending on the radiation wavelength (extraction level-wavelength profile), i.e. the proportion of extractable radiation depends on the respective wavelength of the radiation.

In addition, according to the invention, the filter unit can be designed to be transmissive or reflective, more particularly wherein the filter unit is designed in such a way that reflection or transmission of electromagnetic radiation within the extractable wavelength range can be effected at the filter.

Moreover, in the context of the invention, an extraction wavelength for the extracted radiation can be derivable from the variation of the optical thickness that can be carried out by means of the optical thickness varying means, more particularly by means of a measurement by the detector. The measuring system can thus additionally make it possible for the wavelength detected on the detector to be determined by means of the filter unit. For this purpose, e.g. the distance between the mirror elements is varied within a specific distance range, this range being delimited by the structural design of the filter unit, or said distance range is traversed. At the same time, a measurement by means of the detector, for example an intensity measurement, is effected and measured intensities are assigned in each case to an adjusted mirror element distance. From the data generated in this case, it is possible to determine an intensity maxima with associated distance value and as a consequence from the distance value it is possible to deduce the wavelength defined thereby (extraction wavelength) of the filter and the wavelength of the detected radiation. An analogous procedure can also be adopted with regard to the refractive index of the cavity. In this case, for example, by varying the electrical voltage that determines the refractive index, the transmissivity of the filter is varied in a controlled manner.

Furthermore, according to the invention, part of the electromagnetic radiation emitted by the radiation source can be able to be coupled out as reference beam by a beam coupling-out element and a reference wavelength can be measurable by a sensor. In this case, the optical thickness can be adjustable depending on the measured reference wavelength in such a way that the reference wavelength lies in the extracted wavelength range. Such an arrangement can allow a precise, continuous determination of the respectively emitted wavelength of the radiation source. This reference wavelength can then be used for adjusting the filter unit. The distance or the refractive index can be adjusted on this basis in such a way that that extractable wavelength range whose center wavelength at least substantially corresponds to the reference wavelength is defined thereby. Thus, the extractable wavelength range of the filter can be updated continuously depending on the reference measurement.

Furthermore, the detector can be designed as a photodiode, CMOS or PSD area sensor, and/or the measuring system can comprise at least one further radiation source having a further emission wavelength.

Furthermore, according to the invention, the optical thickness can be adjustable by means of an electrical control signal, preferably a voltage, being applied to the optical thickness varying means, wherein the optical thickness can be adjustable depending on an applied control signal value. The adjusting or shifting of the position of the mirror elements (and thus of the transmission or reflection behavior) can be effected e.g. preferably electromechanically. For this purpose, actuators installed in the optical thickness varying means can be driven in a targeted manner and the mirrors can be moved by means of said actuators. A desired distance between the mirrors can thus be adjusted by the application of a defined voltage or of a specific signal. In addition, the refractive index of the cavity or of the medium in the cavity can likewise be adjusted by the application of an electrical control signal.

According to the invention, more particularly, the cavity can have an optically variable medium having a material refractive index, more particularly wherein the medium is embodied by an electroactive polymer and the material refractive index can be variable in a defined manner by means of the electronic control signal, more particularly by the application of a voltage, such that the optical thickness and thus the extractable wavelength range is varied. By means of materials whose optical properties can be adjusted for example depending on the magnitude of an electrical voltage present at the material, it is thus possible to realize a variability of the wavelength range to be extracted for interference filters.

More particularly, according to the invention, the system can comprise a database in which an assignment table having distances between the mirror elements and respective wavelength ranges is stored, more particularly wherein the respective wavelength ranges depending on refractive indices of the cavity are stored.

In addition, according to the invention, the distance between the mirror elements and/or the refractive index of the cavity can be adjustable depending on a defined wavelength to be extracted by means of the assignment table.

According to the invention, in addition, in the database a parameterization for the radiation source for determining the emission wavelength can be stored and the distance between the mirror elements and/or the refractive index of the cavity can be adjustable depending on parameters of the parameterization, more particularly a parameterization representing a dependence of the emission wavelength on current and/or temperature of the radiation source.

Thus, firstly, assignments of mirror distances and extractable wavelength ranges defined thereby can be stored in the database. It is thus possible e.g. to adjust a desired wavelength or a wavelength range by means of a specific adjustment of the distance between the mirror elements. Alternatively or additionally, a relationship between the refractive index of the cavity, the distance between the mirror elements and the extractable wavelength range can be available in the database. For this purpose, furthermore, respectively required control signals can be stored and the desired wavelength range can thus be adapted by means of corresponding driving of the filter. Furthermore, the radiation source arranged in the measuring system can be parameterized in the database or the table, that is to say that an assignment is stored which makes it possible to establish a relationship between the emitted wavelength and a current present at the radiation source and/or a temperature of the radiation source. The wavelength range of the filter unit can thereby be adjusted on the basis of the forward current and/or the radiation source temperature and be adapted to the emission wavelength.

The invention also relates to the use of a filter unit in an optical measuring system, comprising at least two mirror elements which are at least partly reflective and which are constructed in a multilayered fashion, wherein the mirror elements are oriented substantially parallel to one another and two adjacent mirror elements in each case enclose a cavity and are arranged at a specific distance with respect to one another. Furthermore, an optical thickness is defined by a refractive index of the cavity and by the distance between the mirror elements. Furthermore, the filter unit has optical thickness varying means for varying the optical thickness, such that an extractable wavelength range of the filter unit is varied, more particularly wherein the optical thickness varying means have actuating means for varying the position of the mirror elements and/or refractive index adjusting means for varying the refractive index of the cavity. More particularly, in this case the optical thickness is variable continuously during operation. In this case, the filter unit is used in an optical measuring system for determining coordinates of points, more particularly for distance measurement, more particularly a geodetic surveying apparatus, coordinate measuring machine or scanning device, for extracting electromagnetic radiation in the defined wavelength range according to the interference principle.

A further aspect of the invention is a measuring method for determining coordinates of points, more particularly for distance measurement, more particularly by means of a geodetic surveying apparatus, coordinate measuring machine or scanning device, comprising emitting electromagnetic radiation having an emission wavelength, extracting electromagnetic radiation in a defined wavelength range according to the interference principle, and detecting the extracted radiation. Furthermore, extracting the electromagnetic radiation is effected with the aid of a filter unit, wherein the filter unit comprises at least two mirror elements which are at least partly reflective and which are constructed in a multilayered fashion, wherein the mirror elements are oriented substantially parallel to one another and two adjacent mirror elements in each case enclose a cavity and are arranged at a specific distance with respect to one another. Furthermore, an optical thickness is defined by a refractive index of the cavity and by the distance between the mirror elements. The optical thickness is varied such that as a result an extractable wavelength range of the filter unit is varied such that the emission wavelength lies within the extractable wavelength range, more particularly wherein changing the position of the mirror elements and/or varying the refractive index are/is effected, more particularly continuously.

BRIEF DESCRIPTION OF THE DRAWINGS

The system according to the invention and the method according to the invention are described in greater detail purely by way of example below on the basis of concrete exemplary embodiments illustrated schematically in the drawings, further advantages of the invention also being discussed. In the figures more specifically.

Figure 1A:
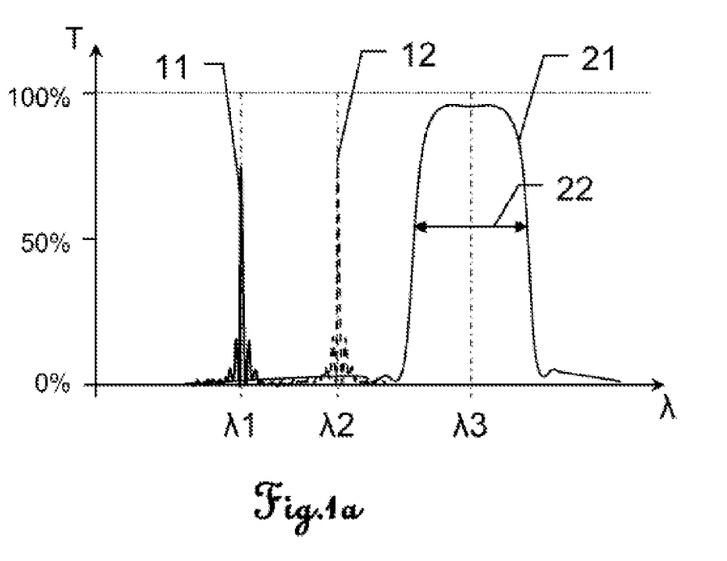
FIGS. 1*a-b* in each case show a center wavelength deviation between a laser radiation and a filter.

FIG. 1*a* shows a center wavelength deviation between a laser radiation and a spectrally narrowband filter. In this case, the curves 11,12 in each case represent an intensity distribution of an emitted laser radiation. If the laser radiation impinges on the spectrally narrow band interference filter, a transmission T of radiation having a specific wavelength can thus be achieved. The wavelength range 22 (typically having a full width at half maximum (=FWHM) of 60 nm, 10 nm or 1 nm) is defined by the transmission behavior—represented by the curve 21—of the filter depending on the respective wavelength, wherein a center wavelength λ3 represents the center of the range 22. Both commercial laser diodes and narrowband interference filters have typical center wavelength deviations of +/−5 to +/−10 nm. The curve 11 shows, for example, the emission spectrum of a laser diode at 20° C., and curve 12 that at 50° C. Moreover, the filter exhibits a transmission profile having a central transmission wavelength at λ3. The emission wavelengths λ1,λ2 of the respectively illustrated laser diode radiations here do not reach the transmissive wavelength range 22 of the filter designed as a bandpass filter. In the present situation, therefore, the radiation from the laser diodes cannot be transmitted through the filter and e.g. cannot be passed on to a detector arranged downstream. The bandwidth for the filtering of the laser radiation is intended, moreover, to be fashioned as narrowly as possible in order that largely light only in a suitably sharply defined wavelength range, more particularly of one wavelength, is filtered or allowed to be transmitted.

Figure 1B:
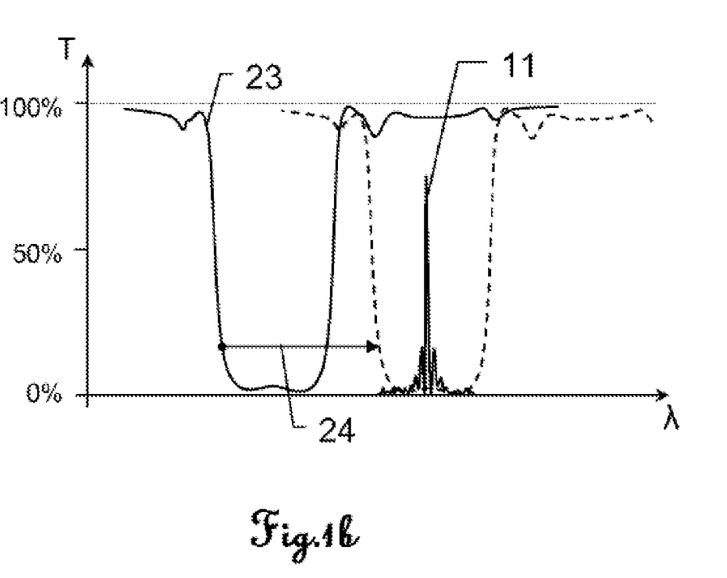

FIG. 1*b* shows the spectral behavior 23 of a notch filter. A spectral deviation between the laser emission and a zone of action of the filter is once again present. With such a type of filter, the extraction of the useful radiation is not achieved by means of the transmission of a defined wavelength, but rather by reflection of light having said wavelength. Such notch or stop filters can be used as spectrally selective reflectors in order to pass exclusively useful radiation to a detector. The arrow 24 indicates such a shift in the range of action of the filter which would bring about a reflection of the laser radiation. After this shift, the emission wavelength of the laser radiation is in the wavelength range in which the notch filter acts.

Figure 2:
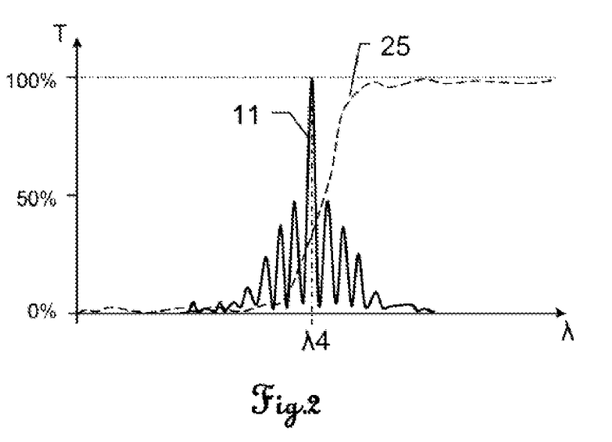
FIG. 2 shows a spectral characteristic of a long-pass filter.

FIG. 2 shows a spectral characteristic 25 of a long-pass filter. This type of filter is based (likewise, analogously to types of filter described above) on the principle of multi-beam interference. The layer structure of long-pass, short-pass or band-stop filters can substantially consist of a dielectric mirror, in the simplest case of a two-material structure, for example of TiO2/SiO2 layers having alternating high and low refractive indices with identical optical thickness. In the simplest case, the optical thicknesses of the film layers are stipulated as identical in magnitude, such that the phase shifts of the partial waves upon passing through the layer are π/2. This approach can be expressed in connection with refractive indices, film thicknesses and a design wavelength by nH*1H=nL*1L=λo/4, where λo stands for the design wavelength, nH,nL stand for the refractive indices of the two materials, and 1H,1L stand for the respective film thicknesses. Furthermore, H can represent the optical thickness of a λo/4 layer composed of high refractive index material, and L can represent the corresponding λo/4 layer composed of low refractive index material. Such dielectric mirrors are also designated as Bragg reflectors. In this case, a shift in the reflection curve can be effected by a variation of the layer thickness or of the refractive index of at least one layer. If two or more layer distances are varied simultaneously, then it is possible, for example, to shift the reflection range of a notch filter or the spectral edge of a short- or long-pass filter over a larger wavelength range, without the filter characteristic changing greatly. Layer sequences of dielectric filters composed of a two-material structure are generally specified with the succession of the layer thicknesses. A notch filter having the design wavelength of λo=550 nm which can be adjusted with two adjustable layer thicknesses can be represented for example as follows: [0.31H,11L,0.61H,10.51L, (0.61H,x1L)^2,0.61H,10.51L, 0.31H]. If "x" is adjusted e.g. from 9.8 to 10.8. the center wavelength of the notch filter changes continuously from 585 nm to 615 nm.

There is also the possibility of combining a long-pass filter with a short-pass filter, as a result of which a transmissive extraction of radiation in a specific wavelength range can be achieved. Filtering of light in a relatively narrow wavelength range can be achieved through the suitable combination of these two types of filter. In this case, one edge of the band-limited filter effect is brought about by the long-pass filter, and the other edge by the second, additional filter. A spectrum of a laser emission 11 whose center wavelength λ4 is slightly offset with respect to the maximum transmission capability of the filter is additionally shown.

Figure 3A:
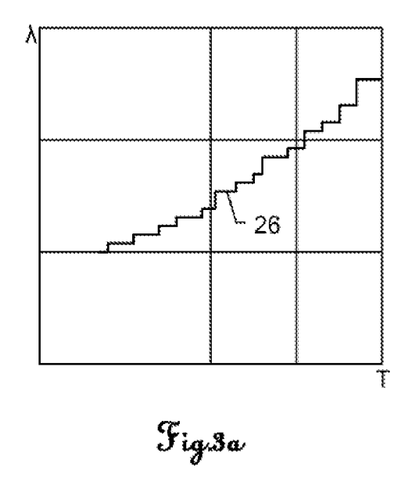
FIGS. 3*a-b* show a wavelength drift of radiation emitted by a laser diode as a function of temperature and power, respectively.
Figure 3B:
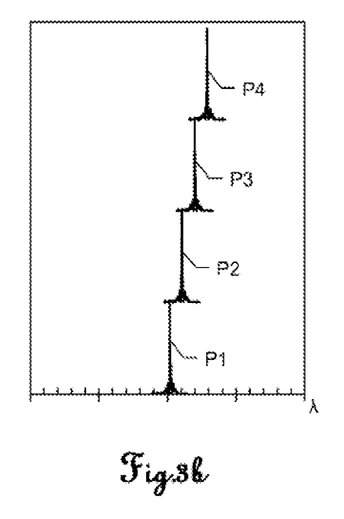

FIGS. 3a, 3b in each case show a wavelength drift 26 of radiation emitted by a laser diode as a function of temperature and power, respectively. In this case, FIG. 3a shows a curve 26 for an intrinsic temperature drift of the emission wavelength of a semiconductor laser diode. In the case of semiconductor materials such as GaAs or InGaP, the wavelength of the laser diodes can drift on account of the spectral variance of the internal gain profile e.g. by 0.3 nm/° C. In addition, the center wavelength of laser diodes can vary depending on respective production conditions of a production batch for example by up to 0.8%. These two effects result in the disadvantage that e.g. in apparatuses having a specified temperature range of −30° C. to +70° C., the center wavelength of the laser can deviate by up to +/−20 nm. If the laser diodes are additionally operated with pulsed excitation, then they tend toward multimode emission with a width of up to 3 nm. In order to achieve an efficient, high transmission by the reception filter in the previous devices, therefore, the interference filter has to have a wide transmission curve (FWHM up to 60 nm, FWHM=full width at half maximum). Furthermore, semiconductor laser diodes can also have a weak wavelength drift depending on the forward current. The laser power P can be adjusted by means of the forward current. The laser power can be used for signal matching for example in the automatic target measuring device, where it is possible, inter alia, to control the image brightness of the target object (reflector target) on a CMOS sensor. FIG. 3b illustrates a drift of the emission wavelength of a semiconductor laser diode for various power adjustments P1,P2,P3, P4 for the diode.

Figure 4A:
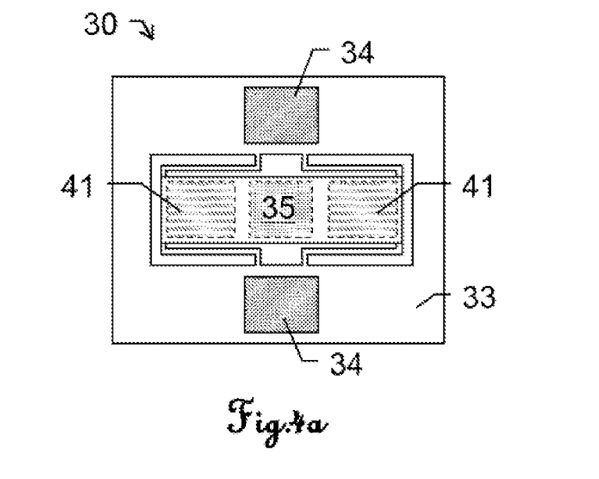
FIGS. 4*a-b* show a first embodiment of a tunable interference filter.
Figure 4B:
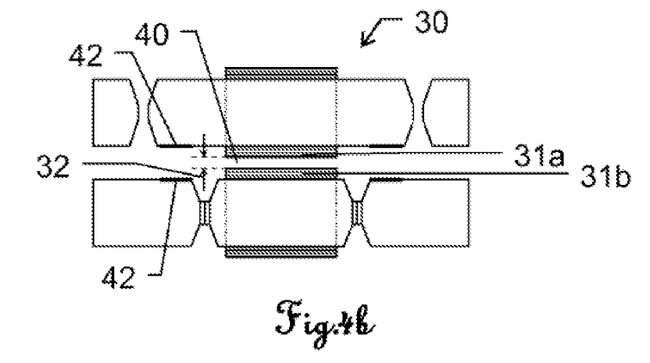

FIGS. 4a and 4b schematically illustrate a first embodiment of a simple, tunable interference filter 30, FIG. 4a showing a plan view and FIG. 4b a cross section of the filter. Interference filters 30 can be constructed as a Fabry-Perot interferometer, which involves a construction comprising two low-loss reflective mirrors 31a,31b arranged in an optical region 35 and situated at a defined distance 32 from one another. In order to realize the mirrors 31a,31b with low optical losses, that is to say substantially without absorption, they can be designed as vapor-deposited dielectric multilayers. In the simplest case, the mirrors can consist of quarter-wave packets of the structure (HL)^q, where q indicates the number of double layers (HL). The abbreviation H denotes the optical thickness of a λo/4 layer composed of high refractive index material, and L the corresponding λo/4 layer composed of low refractive index material. With a phase-shifted multilayer structure of the form [(HL)^q,x*$L_{air}$, (HL)^q], wherein the two Bragg mirrors (HL)^q are separated from one another by a cavity, it is possible to realize a very narrowband transmission filter. In this case, the cavity can be designed as an air gap 40. In this case, the narrow transmission curve can be spectrally shifted with the variation of the air gap width. In particular, the cavity can be provided with a medium whose refractive index is variable. In this embodiment, therefore, it is additionally possible to achieve a variation of the transmission curve by means of a change in the refractive index of the medium, for example by the application of a defined voltage. The width of the transmission curve (FWHM) is defined by the number q of layers of the two highly reflective mirrors, the FWHM width decreasing with a higher number of layers. With a repetition of a plurality of Fabry-Perot structures [(HL)^q,L,(HL)^q] and different q-values, the transmission curve can be adjusted to be even narrower and flatter particularly in the transmission range. One exemplary double-resonator structure can be represented by [(HL)^q, x1*$L_{air}$,(HL)^q]/(HL)^q, x2*$L_{air}$,(HL)^q]. In the case of such a structure, preferably both spacers x1 and x2 would have to be varied simultaneously for the purpose of wavelength adjustment.

The adjusting and mirror element illustrated in FIGS. 4a and 4b forms, by means of the air gap 40, a cavity for a simple Fabry-Perot filter. The distance 32 between the two mirrors 31a,31b can be varied in a defined manner and the center wavelength of the filter 30 can thereby be shifted to short or long wavelengths. Such interference filters 30 can be realized using MEMS technology, for example. With micromechanics, a miniaturization advantage in the device construction together with cost-effective production is accessible. Nowadays, the electrically tunable elements 41,42 can additionally be integrated in the adjusting and mirror elements. Silicon wafers having optical quality are suitable as carrier material 33, for example; this material is transmissive to wavelengths of greater than 1200 nm. Glass wafers (fused silica) or quartz plates are suitable for wavelengths in the visible or near infrared. The mirror layers 31a,31b with a defined spectral reflectivity are applied to said carrier plates 33, wherein the air gap 40 or a specific optical medium between the two mirrors 31a,31b can form the main cavity. In addition, provision is made of electrodes 34 for regulating or controlling the distance 32 by application of an electrical control signal or by application of a defined voltage on the carrier.

The resonance wavelengths λR of a Fabry-Perot resonator with high transmission are situated at the locations λR=2*nc*d/m. In this case, "nc" is the refractive index of the spacer material and "d" is the distance 32 between the two multilayer mirrors. The resonance order "m" is an integer≥1. As "m" increases, short transmission wavelengths can thus be achieved. With the aim of being able to obtain a large tuning range in a micromechanical interferometer, in particular the first or a low order m can be chosen. As a result, such a design can be suitable for many metrological applications.

Figure 5:
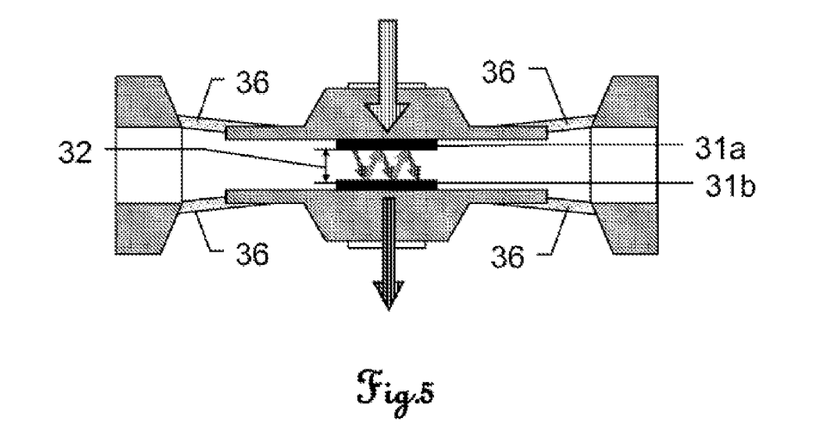
FIG. 5 shows a second embodiment of a tunable interference filter with springs.

Furthermore, the full width at half maximum (FWHM) of the transmission maxima is FWHM=2*nc*d/m²/F, where "F" stands for the finesse of the cavity. Owing to technologically governed defects, the real transmission maxima are often less than 100%. This is caused in particular by surface defects which occur during the adjustment or displacement of the movable mirrors 31a,31b or plates. During the movement, the parallel alignment between the two mirrors 31a, 31b can be subjected to a wedge error; moreover, the mirror plates can be increasingly strained in the case of large deflections by means of springs 36 or flexures, which can lead to deformations of the mirrors 31a,31b. Proceeding from a parallel alignment of the mirror elements 31a,31b in a zero position, the two mirror elements 31a,31b are intended also to be understood as aligned substantially parallel to one another even in the context of these deformations and/or wedge errors. A second embodiment of a tunable interference filter having such springs 36 is shown in FIG. 5. The effective finesse F of the cavity can thus be limited to medium to high values. A finesse having a value of greater than 50 is sought particularly for metrological devices.

Figure 6:
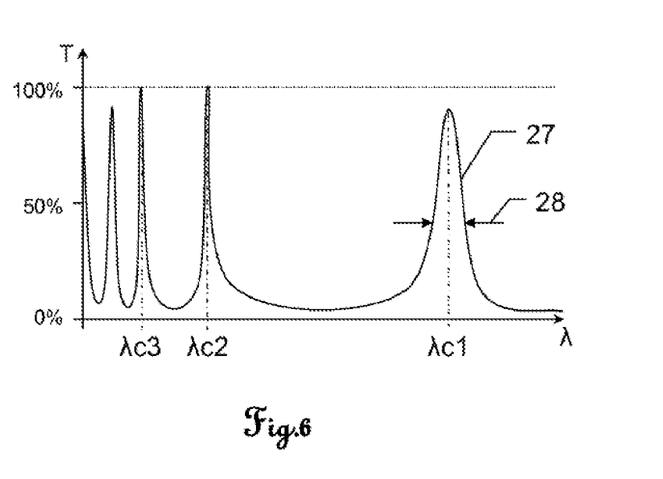
FIG. 6 shows a typical transmission curve of a Fabry-Perot interference filter.

FIG. 6 shows a typical transmission curve 27 of a Fabry-Perot interference filter, wherein the transmission T of the filter is represented as a function of the wavelength λ. The transmission peaks occur repetitively here on the wavelength scale (respectively for the wavelengths λc1,λc2,λc3) and are Lorentz-shaped to a first approximation in proximity to the peaks. The full width at half maximum 28 (FWHM) is additionally illustrated for the transmission maximum around λc1 (first order).

Figure 7:
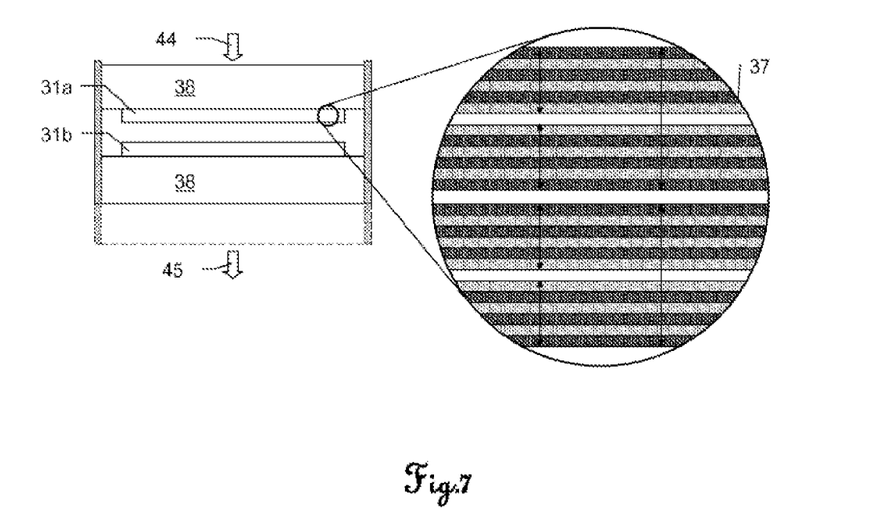
FIG. 7 shows a dielectric layer construction for filters with a spectrally specific profile.

FIG. 7 shows a possible dielectric layer construction 37 for a tunable filter of a spectrally specific profile. The two opposite mirror elements 31a,31b -consisting of two Bragg reflectors—are in each case arranged on a substrate 38 and make possible, by means of the dielectric layer construction 37 illustrated in an enlarged fashion, firstly a low-loss filtering of incident light 44, such that only light within a defined wavelength range emerges 45 from the filter. Secondly, a specifically adapted layer construction 37 makes it possible to determine the light to be filtered or extracted.

Figure 8:
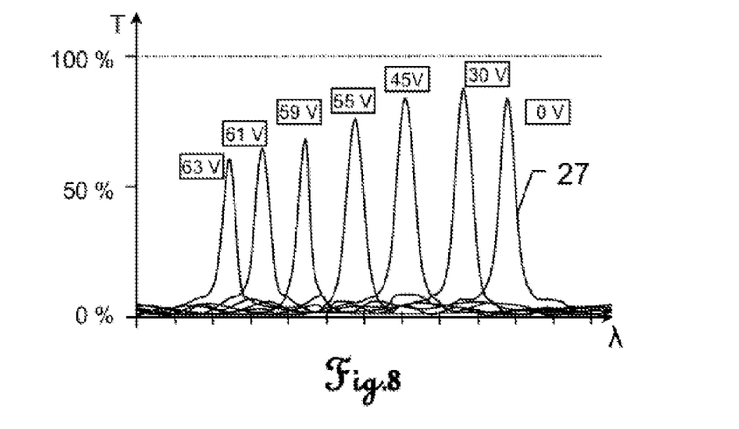
FIG. 8 shows a transmission curve of a tunable interference filter at different control voltages.

FIG. 8 shows a transmission curve 27 of a tunable interference filter (MEMS) with capacitive actuators according to the construction in accordance with FIG. 5 for various control voltages (0V-63V). In this exemplary embodiment, the transmission window shifts to shorter wavelengths with the increase in the control voltage, this taking place on account of the decrease in the distance of the cavity between the two multilayer sequences. With increasing voltages, therefore, the transmission of the filter can become smaller, e.g. because deviations from planarity and parallelism (wedge error) can occur in the case of large travel distances of the reflector plates. As a result, the finesse and thus the transmission of the filter or of the two mirror surfaces can vary in such a way that the quality of the filtering decreases and more light is thus absorbed by the filter.

Figure 9A:
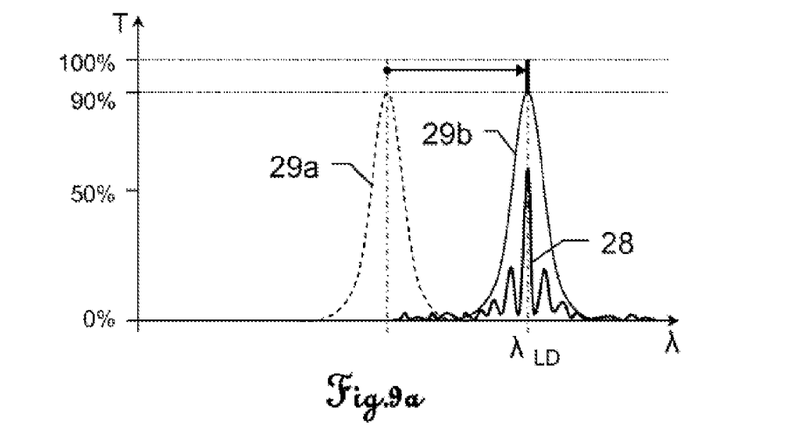
FIGS. 9*a-b* in each case show an application according to the invention of a tunable interference filter with one and two laser beam sources, respectively.
Figure 9B:
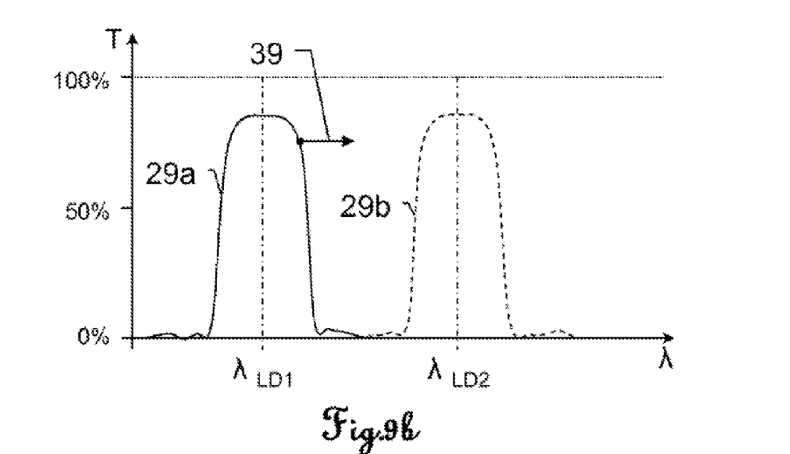

FIGS. 9a, 9b in each case show an application according to the invention of a tunable interference filter with one and two laser beam sources, respectively. FIG. 9a shows the emission spectrum 28 of a laser diode having a main emission wavelength λLD. Furthermore, a filter spectrum 29a of a tunable interference filter is illustrated, wherein an interference wavelength of the filter is adjustable by the application of a defined electrical control signal (voltage). In order that the radiation emitted by the laser diode can then be filtered or extracted as narrowly and efficiently as possible, the voltage present at the filter can be varied in such a way that a transmission peak defined by the filter properties substantially includes the spectrum 28 of the diode. Through the application of the voltage, the peak can be shifted such that the center wavelength of the filter spectrum 29b of the interference filter corresponds as much as possible to the emission wavelength λLD and optimum filtering or transmission can thus be achieved.

FIG. 9b shows in each case the emission wavelengths λLD1 and λLD2 of two laser diodes and an interference spectrum 29a of a filter. The shift 39 of the interference spectrum 29a in such a way that in each case light either of the wavelength λLD1 or of the wavelength λLD2 is filtered can in this case once again be effected by means of the application or variation of a voltage and a resultant variation of the distance between the mirror elements of the filter and/or variation of the refractive index of the cavity. Such an application of the filter can be suitable for example with the use of two different laser sources together with a common receiver. The interference spectrum 29a,29b can then be adjusted to the respective laser wavelength λLD1,λLD2 depending on the laser radiation to be measured. Consequently, the arrangement of a tunable interference filter in a beam path used jointly by two radiation sources can be used both for the effective filtering of the first radiation and for the filtering of the second radiation and, accordingly, mean a low constructional and financial outlay with regard to the production of an optical component.

Figure 10:
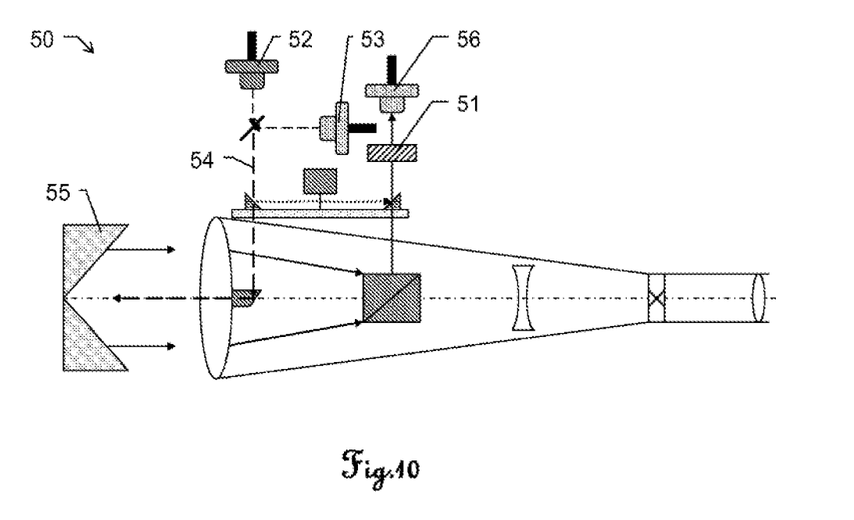
FIG. 10 shows an optical construction according to the invention e.g. of a surveying device for distance measurement with a tunable interference filter.

FIG. 10 shows an optical construction 50 according to the invention e.g. of a surveying device, more particularly of a theodolite, of a total station or of a laser scanner, for distance measurement with a tunable interference filter 51. Furthermore, two laser diodes 52,53 as radiation sources are arranged in the device, and in each case emit a characteristic laser radiation and use a common beam path 54 (the emitted radiations can in this case differ significantly with regard to their wavelengths). The light is guided via mirror, focusing and/or expansion optical units onto an object 55, more particularly a reflector, and is reflected from the object 55. The reflected light is in turn detected by means of the optical construction 50 and passed to a detector 56 designed for detecting the radiation both of the first and of the second laser diode 52,53. In addition, the tunable interference filter 51 is disposed upstream of the detector 56, wherein the filter 51 can be embodied in accordance with one of FIGS. 4a, 4b, 5. The radiation to be extracted by the filter 51 can be adjusted by individual adaptation of the interference spectrum (in accordance with FIG. 9b) of the filter 51. In this case, by way of example, a respective wavelength can be known for each diode 52,53 under defined conditions (e.g. temperature, current) and be stored in the system. Proceeding therefrom, the filter can traverse a specific wavelength range around these known laser wavelengths and, at the same time, by means of the detector 56, a received intensity can be measured and a suitable adjustment for a measuring process can thus be found. In particular, a reference beam can in each case be coupled out from the emitted radiations and the wavelength of this beam can be measured continuously by means of a further detector. The filter 51 can then be adjusted depending on the wavelength respectively measured. For this purpose, an assignment table can be provided, for example, which establishes a relationship between the wavelength extractable by the filter 51 and the voltage to be applied to the filter 51 for this purpose (or the distance between the mirror elements and the refractive index). Moreover, in particular continuously, the temperature of the laser emitters 52,53 and the current that is present can be determined and the filter 51 can be adapted by means of a stored assignment function or table in such a way that the radiation respectively emitted is filtered in a suitable manner.

Figure 11:
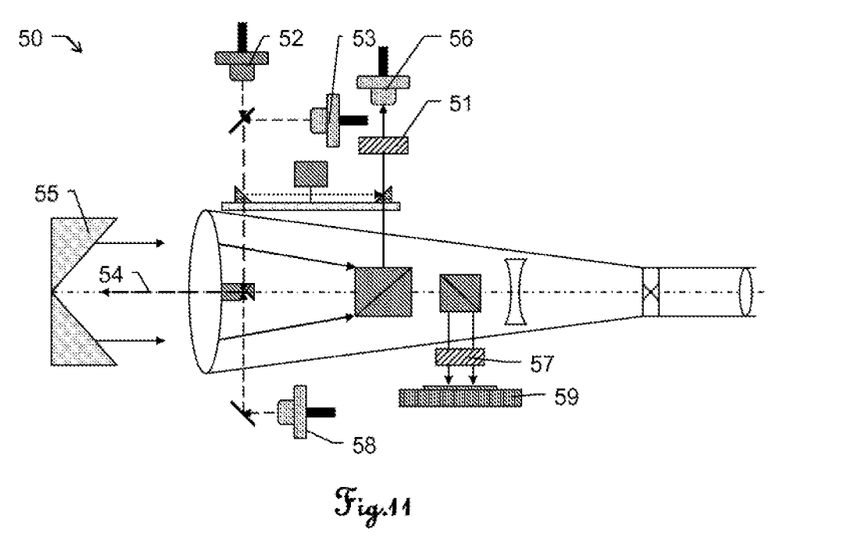
FIG. 11 shows a further embodiment of an optical construction according to the invention e.g. of a surveying device for distance measurement and direction measurement (ATR)

FIG. 11 shows a further embodiment of an optical construction 50 according to the invention more particularly of a surveying device for distance measurement and automated direction measurement (ATR) comprising three laser sources 52,53,58 and two detectors 56,59, wherein the detector 59 can be designed as PSD, CCD or CMOS and can be used for automatic target tracking. The radiations emitted by the lasers 52,53,58 can differ in terms of wavelength and are guided in such a way that a common beam path 54 is used for them and the laser beams are in each case reflected at an object 55. Respectively tunable interference filters 51,57 are in turn disposed upstream of the two detectors 56,59 in order to filter out incident disturbing ambient light and to prevent it from impinging on the detectors 56,59. On account of the drift behavior of the laser diodes 52,53,58, the wavelengths that are respectively to be filtered can be adjusted by tuning the distance between the mirror surfaces in the filters. This adjustment can be effected e.g. with regard to two wavelengths to be extracted by a filter in accordance with FIG. 9b or solely on the basis of the wavelength drift in accordance with FIG. 9a.

Figure 12:
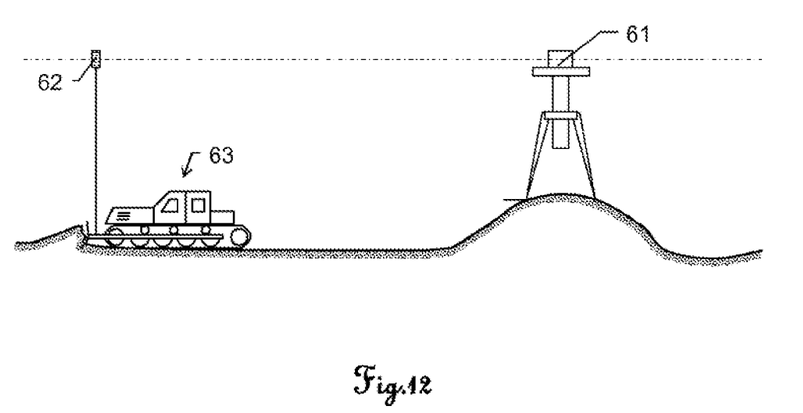
FIG. 12 shows an application according to the invention of an interference filter for construction machine control.

FIG. 12 shows an application according to the invention of an adjustable interference filter for construction machine control. In this case, a laser emitter 61 is positioned in the terrain and a receiver 62 for receiving the radiation emitted by the emitter 61 is provided on a construction machine 63. The receiver 62 has a tunable interference filter. Thus, by way of example, the receiver 62 can be adapted to a drift of the emitted radiation, in particular in a temperature-dictated manner, by continuous regulation of the interference spectrum and ambient radiation can be reliably kept away.

It goes without saying that these illustrated figures merely schematically illustrate possible exemplary embodiments. The different approaches can, according to the invention, likewise be combined with one another and with methods and devices for distance measurement and with measuring apparatuses from the prior art.

What is claimed is:

1. An optical distance measuring system for determining coordinates of points based on measured distances, comprising:
    a radiation source for emitting electromagnetic radiation having a center emission wavelength, and
    a receiving unit having:
        a filter unit for extracting electromagnetic radiation in a defined wavelength range according to an interference principle; and
        a detector arranged in such a way that the radiation that can be extracted by means of the filter unit is detectable by the detector,
        wherein the filter unit includes:
        at least two mirror elements which are at least partly reflective and which are constructed in a multilayered fashion, wherein the mirror elements are oriented substantially parallel to one another and two adjacent mirror elements in each case enclose a cavity and are arranged at a specific distance with respect to one another, wherein an optical thickness is defined by a refractive index of the cavity and by the distance between the mirror elements, and wherein the two mirror elements are held by springs;
    optical thickness varying means for varying the optical thickness, such that an extractable wavelength range of the filter unit is varied; and
    a processing unit that derives distance information based on the radiation detected by the detector;
    wherein part of the electromagnetic radiation emitted by the radiation source is coupled out as reference beam by a beam coupling-out element and a reference wavelength is measurable by a sensor; and
    wherein the optical thickness is adjustable depending on the measured reference wavelength in such a way that the reference wavelength lies in the extracted wavelength range.

2. The optical measuring system as claimed in claim 1, wherein:
    the measuring system comprises a regulating unit that interacts with the optical thickness varying means in such a way that the optical thickness is variable, such that the emission wavelength of the emitted radiation lies within the extractable wavelength range.

3. The optical measuring system as claimed in claim 2, wherein:
    the regulating unit interacts with the optical thickness varying means and the detector in such a way that the optical thickness is adjustable depending on a detection of the detector.

4. The optical measuring system as claimed in claim 1, wherein:
    the optical thickness is adjustable by means of the optical thickness varying means in such a way that a measured value detected by means of the detector exceeds a defined threshold value.

5. The optical measuring system as claimed in claim 1, wherein:
    the extractable wavelength range is defined by a center wavelength representing an extraction maximum, and a tolerance range around the center wavelength defined depending on an extraction level-wavelength profile.

6. The optical measuring system as claimed in claim 1, wherein:
    the filter unit is designed to be transmissive or reflective; and
    the filter unit is designed in such a way that reflection or transmission of electromagnetic radiation within the extractable wavelength range is effected.

7. The optical measuring system as claimed in claim 1, wherein:
    an extraction wavelength for the extracted radiation is derivable from the variation of the optical thickness that can be carried out by means of a measurement by the detector.

8. The optical measuring system as claimed in claim 1, wherein:
    the detector is designed as a photodiode, CMOS or PSD area sensor; and/or
    the measuring system comprises at least one further radiation source having a further emission wavelength.

9. The optical measuring system as claimed in claim 1, wherein:
    the optical thickness is adjustable by means of an electrical control signal being applied to the optical thickness varying means, wherein the optical thickness is adjustable depending on an applied control signal value.

10. The optical measuring system as claimed in claim 1, wherein:
    the cavity has an optically variable medium having a material refractive index.

11. The optical measuring system as claimed in claim 1, wherein:
    the system comprises a database in which an assignment table having distances between the mirror elements and respective wavelength ranges is stored.

12. The optical measuring system as claimed in claim 11, wherein:
in the database a parameterization for the radiation source for determining the emission wavelength is stored and the distance between the mirror elements and/or the refractive index of the cavity are/is adjustable depending on parameters of the parameterization that represents a dependence of the emission wavelength on current and/or temperature of the radiation source.

13. The optical measuring system as claimed in claim 1, wherein:
the optical thickness varying means have actuating means for varying the position of the mirror elements and/or refractive index adjusting means for varying the refractive index of the cavity.

14. The optical measuring system as claimed in claim 13, wherein:
the optical thickness is variable continuously during operation.

15. The optical measuring system as claimed in claim 2, wherein:
the optical thickness is automatically variable.

16. The optical measuring system as claimed in claim 10, wherein:
the medium is embodied by an electroactive polymer and the material refractive index is variable in a defined manner by means of the application of a voltage, such that the optical thickness is varied.

17. The optical measuring system as claimed in claim 11, wherein:
the respective wavelength ranges depending on refractive indices of the cavity are stored; and
the distance between the mirror elements and/or the refractive index of the cavity are/is adjustable depending on a defined wavelength to be extracted by means of the assignment table.

18. A distance measuring method for determining coordinates of points based on measured distances in an optical distance measuring system, the method comprising:
using a filter unit of the optical distance measuring system to extract electromagnetic radiation in a defined wavelength range having a center emission wavelength according to an interference principle, the filter unit including:
at least two mirror elements which are at least partly reflective and which are constructed in a multilayered fashion, wherein the mirror elements are oriented substantially parallel to one another and two adjacent mirror elements in each case enclose a cavity and are arranged at a specific distance with respect to one another, wherein an optical thickness is defined by a refractive index of the cavity and by the distance between the mirror elements, and wherein the two mirror elements are held by springs; and
optical thickness varying means for varying the optical thickness, such that an extractable wavelength range of the filter unit is varied, the optical thickness varying means having actuating means for varying the position of the mirror elements and/or refractive index adjusting means for varying the refractive index of the cavity, the optical thickness capable of being continuously varied during operation to ensure that that the emission wavelength lies within the extractable wavelength range; and
deriving distance information based on the extracted radiation
wherein part of the electromagnetic radiation emitted by the radiation source is coupled out as reference beam by a beam coupling-out element and a reference wavelength is measured by a sensor; and
wherein the optical thickness is adjusted depending on the measured reference wavelength in such a way that the reference wavelength lies in the extracted wavelength range.

19. A distance measuring method for determining coordinates of points based on measured distances, comprising:
emitting electromagnetic radiation having a center emission wavelength;
extracting electromagnetic radiation in a defined wavelength range according to an interference principle; and
detecting the extracted radiation, wherein:
extracting the electromagnetic radiation is effected with the aid of a filter unit, that includes at least two mirror elements which are at least partly reflective and which are constructed in a multilayered fashion, wherein the mirror elements are oriented substantially parallel to one another and two adjacent mirror elements in each case enclose a cavity and are arranged at a specific distance with respect to one another, wherein:
an optical thickness is defined by a refractive index of the cavity and by the distance between the mirror elements, and wherein the two mirror elements are held by springs,
varying the optical thickness of the filter unit such that the emission wavelength lies within the extractable wavelength range; and
deriving distance information based on the extracted radiation;
wherein part of the electromagnetic radiation emitted by the radiation source is coupled out as reference beam by a beam coupling-out element and a reference wavelength is measured by a sensor; and
wherein the optical thickness is adjusted depending on the measured reference wavelength in such a way that the reference wavelength lies in the extracted wavelength range.

* * * * *